United States Patent [19]

Maitland et al.

[11] Patent Number: 4,825,446

[45] Date of Patent: Apr. 25, 1989

[54] LASER APPARATUS HAVING CATHODE BORE DIRECTING ELECTRON BEAM ONTO ANODE

[75] Inventors: Arthur Maitland, Fife, Scotland; Clifford R. Weatherup; Ian A. Strudwick, both of Chelmsford, England

[73] Assignee: English Electric Valve Company Limited, Chelmsford, United Kingdom

[21] Appl. No.: 61,347

[22] Filed: Jun. 15, 1987

[30] Foreign Application Priority Data

| | | | |
|---|---|---|---|
| Jun. 14, 1986 | [GB] | United Kingdom | 8614541 |
| Aug. 30, 1986 | [GB] | United Kingdom | 8621022 |
| Sep. 1, 1986 | [GB] | United Kingdom | 8621078 |
| May 20, 1987 | [GB] | United Kingdom | 8711891 |

[51] Int. Cl.[4] .......... H01S 3/097

[52] U.S. Cl. .......... 372/87; 372/56; 372/88

[58] Field of Search .......... 372/87, 88, 56

[56] References Cited

U.S. PATENT DOCUMENTS

| | | | |
|---|---|---|---|
| 3,396,301 | 8/1968 | Kobayashi et al. | 372/88 |
| 3,464,025 | 8/1969 | Bell | 372/56 |
| 3,784,928 | 1/1974 | Crane | 372/33 |
| 3,787,781 | 1/1974 | Medicus | 372/87 |
| 3,828,277 | 8/1974 | Otto et al. | 372/88 |
| 4,420,835 | 12/1983 | Hattori | 372/88 |
| 4,639,926 | 1/1987 | Wang et al. | 372/87 |
| 4,698,546 | 10/1987 | Maitland et al. | 313/446 |

FOREIGN PATENT DOCUMENTS

| | | |
|---|---|---|
| 0080715 | 6/1983 | European Pat. Off. . |
| 1292016 | 10/1972 | United Kingdom . |
| 2132407 | 7/1984 | United Kingdom . |
| 2150742 | 7/1985 | United Kingdom . |

OTHER PUBLICATIONS

Schuebel; "Laser Action in Al II and He I in a Slot Cathode Discharge"; Appl. Phys. Letters; vol. 30, No. 10, May 15, 1977; pp. 516–519.

*Primary Examiner*—William L. Sikes
*Assistant Examiner*—B. Randolph
*Attorney, Agent, or Firm*—Spencer & Frank

[57] ABSTRACT

Laser apparatus includes a ceramic tube within which is contained a gas and a cylindrical cathode having a plurality of holes therethrough. An anode is located along the axis of the tube. During operation of the apparatus, a large potential difference is applied between the anode and cathode, causing a plurality of electron beams to be formed extensive of the holes. Vapor is emitted from the electron bombarded cylindrical rod and becomes excited, and laser action occurs.

23 Claims, 2 Drawing Sheets

LASER APPARATUS HAVING CATHODE BORE DIRECTING ELECTRON BEAM ONTO ANODE

BACKGROUND OF THE INVENTION

This invention relates to laser apparatus. Generally, laser apparatus includes a material which is excited in such a way that a population inversion is established between at least one of the excited states and a lower state so that laser action can occur.

SUMMARY OF THE INVENTION

According to this invention, laser apparatus is provided comprising material which is arranged to form at least part of the laser active medium when excited, a metallic cathode member having a bore, referred to hereafter as a hole, in a surface thereof, an anode member and gas in the region between the anode and cathode members, and arranged such that, when a suitably high potential difference is applied between the cathode and anode members, an electron beam is formed extensive in a direction away from said hole and is arranged to be incident on and thereby excite the material. Typically, the gas pressure is a fraction of a torr, the potential difference is a few kilovolts and the hole has a width of about a millimetre and a depth of a few millimetres. The material arranged to form at least part of the laser active medium may comprise, for example, a fluid or it could comprise a metal which the electron beam is arranged to vaporize. The surface of the metallic cathode member may be covered with an electrically insulating layer except on the walls and base of the hole, or the surface may be substantially bare of dielectric. The latter arrangement may be more suitable where the material is a metal since condensation of metallic material or sputtering may in any case occur and result in a metallic deposition on the cathode surface. The provision of an electrically insulating layer on the surface results in the electron beam being of larger amplitude than would be the case were it to be absent.

The hole may be of any convenient configuration. For example, it may have a circular cross-section or be an elongate slot, the latter resulting in an electron beam which is produced as a sheet along the length of the slot. Also, the hole may be blind or may be an aperture passing through the cathode member.

Preferably, a plurality of holes are included in the surface of the cathode, each hole being arranged such that, when a suitably high potential is applied between the anode and cathode members, an electron beam is formed extensive in a direction away from that hole and is arranged to be incident on the material forming at least part of the laser active medium. By employing a plurality of holes, the power applied to this material may be increased from that available when only one hole is used.

Preferably, the surface of the cathode is shaped so as to focus the electron beams formed into a region at which the material is located. Preferably, the surface of the cathode is curved and arranged to substantially surround the material, and in this arrangement may be used to contain the material. Where the material comprises a metal, the material itself may be arranged to act as the anode member. Alternatively, the anode member may be located to one side of the direction along which an electron beam is formed during operation, enabling the beam to be directed onto the material without hinderance. It may be advantageous, however, to arrange the anode member behind the surface of the cathode, that is, on that side of the surface other than that at which the electron beam is produced. In one configuration, the anode member may be arranged to surround the cathode.

A plurality of cathode members are advantageously included, giving increased design flexibility. It may be preferred that one cathode member is arranged to surround another, and advantageously one is at a higher potential than the other. Preferably, the holes in one cathode member are aligned with those in the other.

BRIEF DESCRIPTION OF THE DRAWINGS

The invention is now further described by way of example with reference to the accompanying drawings, in which.

DETAILED DESCRIPTION OF THE PREFERRED EMBODIMENTS

Figure 1:
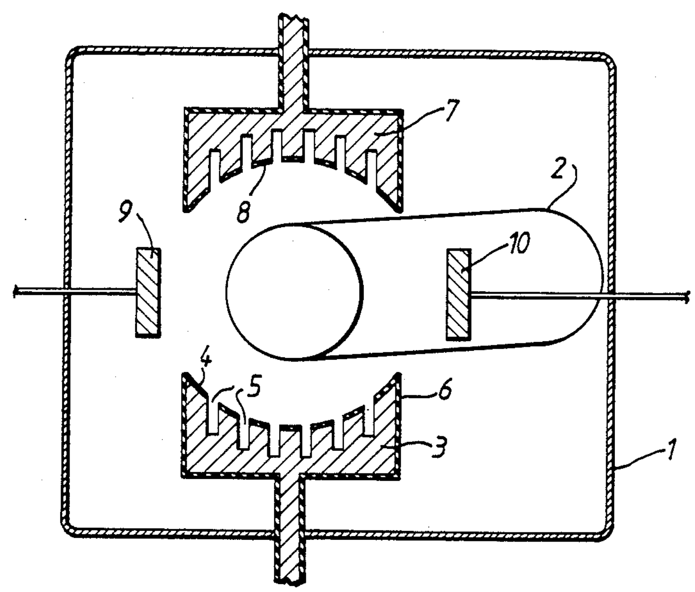
FIG. 1 schematically illustrates partly in section laser apparatus in accordance with the invention.

With reference to FIG. 1, laser apparatus in accordance with the invention includes an envelope 1 which encloses a cylinder 2. The cylinder 2 is of a metal which, when heated to the temperature at which its vapor pressure is adequate, acts as a laser active medium when excited by pumping power, and in this embodiment is of copper, although other metals, such as gold and cadmium for example, could be used. A gas is also contained in the envelope 1 at the low pressures required to form the electron beam, and in this case is neon at about 0.5 torr. A cathode member 3 is arranged within the envelope 1 outside the thin metal cylinder 2 and has a curved front surface 4 with a plurality of holes 5 drilled therein. An electrically insulating layer 6 covers substantially all its surfaces, except for the walls and bases of the holes, which would otherwise be exposed to the gas. A similar cathode member 7 is arranged facing the first cathode member 3 and also has a curved front surface 8. Two anode members 9 and 10 are positioned to the sides of the cathode members 3 and 7.

During operation of the laser apparatus, a suitably large potential difference of a few kilovolts is applied between the anode members 9 and 10 and the cathode members 3 and 7, to cause an electron beam to be formed extensive in a direction away from each of the holes 5 in the front surfaces of the cathodes 3 and 7. The electron beams so formed bombard and heat the cylinder 2 and metal vapor is given off. The impinging electron beams then cause excitation of the metal vapor and laser action occurs.

Figure 2:
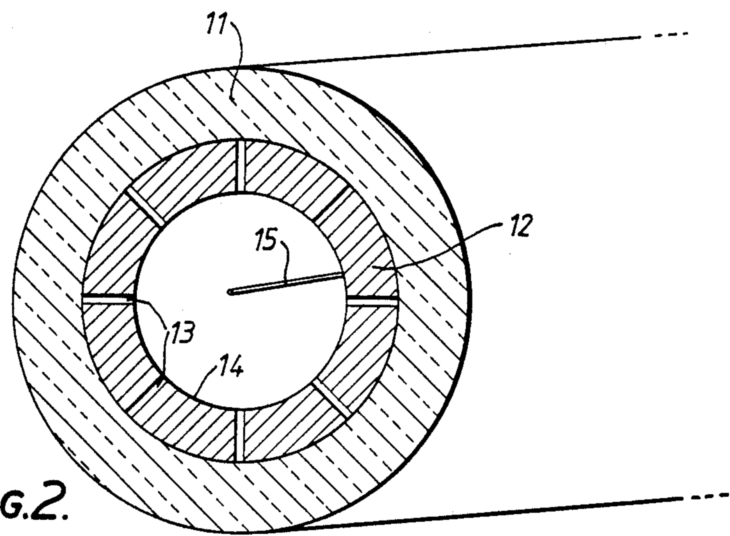
FIG. 2 schematically shows partly in tranverse section another laser apparatus in accordance with the invention.
Figure 3:
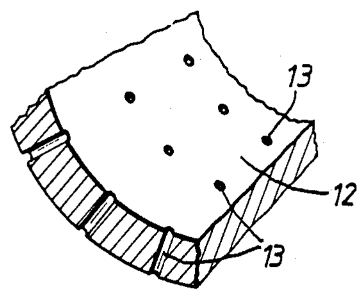
FIG. 3 schematically illustrates in perspective and broken away part of the apparatus of FIG. 2 in greater detail.

With reference to FIGS. 2 and 3, another laser apparatus in accordance with the invention includes a ceramic tube 11 which is lined with a cylindrical cathode member 12 along its length and contains helium gas. the cathode member 12 covers substantially the whole of the inner surface of the envelope 11 and has a plurality of holes 13 drilled through it at intervals along its length and around its circumference. The front surface 14 of the cathode member 12 is bare, not being coated with an electrically insulating layer. Each of the holes 13 is blind, its base being defined by the surface of the ceramic tube 11. An anode member 15 is located within the tube 11 along its longitudinal axis.

During operation, a large potential difference of a few kilovolts is applied between the anode and cathode member 15 and 12. A plurality of electron beams are formed extensive of the holes 13 in a direction towards the center of the apparatus and are focussed at a region along the axis of the tube 11. The metal vapor evaporated from the surface of the anode 15, which in this embodiment is copper, is excited and laser action occurs.

Figure 4:
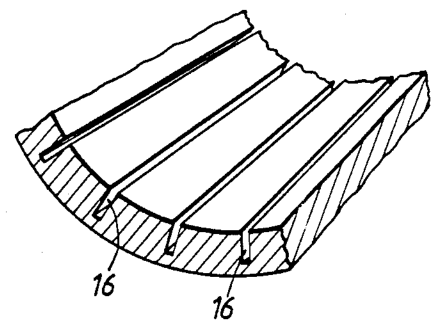
FIG. 4 schematically shows in perspective and broken away another configuration for the cathode member of laser apparatus in accordance with the invention.

With reference to FIG. 4, the holes illustrated in FIG. 3 may be replaced by a plurality of slots 16 arranged to lie in a direction parallel to the axis of the tube 11. During operation, an electron beam sheet is formed extensive of each of the slots 16. In an alternative embodiment (not shown) the slots may be arranged circumferentially around the tube 11.

Figure 5:
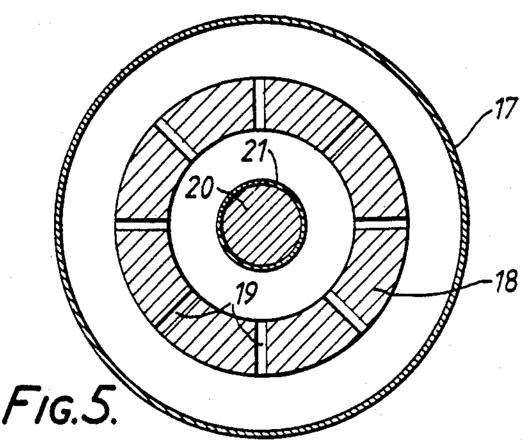
FIG. 5 schematically shows in tranverse section a further laser apparatus in accordance with the invention.

With reference to FIG. 5, another laser apparatus in accordance with the invention includes a metal cylinder 17 within which is enclosed a cylindrical cathode member 18 having a plurality of holes 19 drilled therein. The metal cylinder 17 is arranged to act as an anode during operation of the apparatus. A cylindrical substrate 20 is located along the axis of the cylinder 17 and carries a metal layer 21. The metal layer 21 acts as a source for the laser active medium during operation of the apparatus.

During operation of the apparatus, when a large enough potential difference is applied between the metal cylinder 17 and cathode member 18, electron beams are formed extensive of each hole and directed towards the metal layer 21. The metal is vaporised and forms part of the laser active medium.

The metal layer 21 itself could be arranged to act as an anode member.

Figure 6:
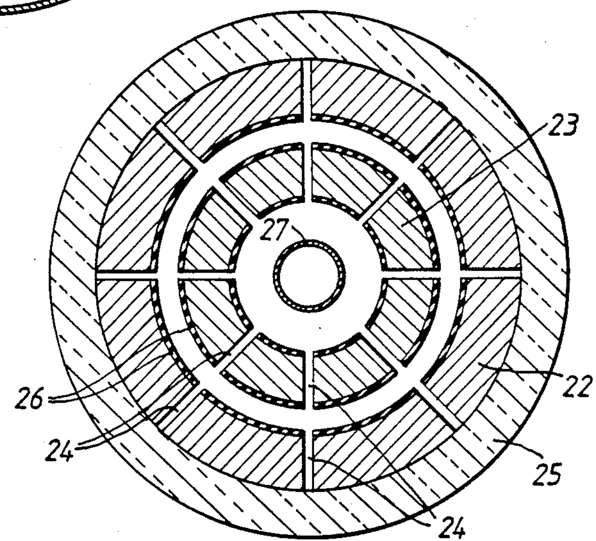
FIG. 6 schematically illustrates in section another laser apparatus in accordance with the invention.

In another embodiment shown in FIG. 6, a plurality of concentric metal rings 22 and 23 are employed to act as cathode members, each of them having a plurality of holes 24 passing entirely through them and aligned with holes in the adjacent ring.

The outer ring 22 is located adjacent a ceramic tube 25 which defines the base of the holes in the ring and contains a low pressure gas. The surfaces of the rings 22 and 23, apart from within the holes 24, are coated with electrically insulating layers 26. A hollow cylindrical metal rod 27 is positioned along the axis of the arrangement and within the inner ring 22, and contains metal, the vapor of which is to form the laser active medium.

During operation, the metal rod 27 is connected to act as an anode member and the two rings 22 and 23 as cathode members, the outer ring 22 being at a lower potential than the inner one. Thus the inner ring 23 acts as an anode with respect to the outer ring 22, being a few kilovolts higher in potential. Electron beams are formed extensive of the holes 24 in the outer ring 22 and accelerated through the holes 24 in the inner ring 23, where there is amplification of the beam currents and an increase in their energy. The electron beams bombard the rod 27, evaporating metal and causing laser action to be produced in the vapor.

Although not shown, windows are of course included at each end of the axis to enable laser radiation to be transmitted from the apparatus.

I claim:

1. In a laser apparatus of the type including a gas-filled envelope having a resonant cavity, and anode and cathode electrodes positioned within said envelope, the gas being a laser active medium and including as a portion thereof a given material vapor, a given material member being positioned in said envelope which provides said given material vapor when sufficiently excited, the improvement comprising:

said cathode being a metallic member having at least one bore in a surface thereof;

means for producing a sufficiently high voltage between said anode and said cathode to produce an electron beam from said at least one bore extensive in a direction away from said at least one bore, said at least one bore being oriented relative to said material member such that said electron beam is incident upon said material member to vaporize said given material member and thereby excite said given material vapor.

2. In a laser apparatus as claimed in claim 1, wherein surfaces of said metallic cathode member are substantially bare of dielectric material.

3. In a laser apparatus as claimed in claim 1, wherein said bore is formed as an elongate slot.

4. In a laser apparatus as claimed in claim 1, further comprising a plurality of bores in said surface of said cathode, each of said plurality of bores being oriented relative to said anode such that, when a suitably high potential difference is applied between said anode and said cathode, an electron beam is formed extensive in a direction away from each of said plurality of bores and incident on said anode, said anode comprising said material member.

5. In a laser apparatus as claimed in claim 4, wherein said surface of said cathode having said plurality of bores is shaped so as to focus said plurality of electron beams formed onto a region of said anode forming said given material member.

6. In a laser apparatus as claimed in claim 5, wherein said surface of said cathode having said plurality of bores is curved and arranged to substantially surround said anode, said anode comprising said given material member.

7. In a laser apparatus as claimed in claim 4, wherein said surface of said cathode having said plurality of bores therein is covered by a dielectric material except along interior surfaces of said bores.

8. In a laser apparatus as claimed in claim 1, wherein said given material comprises a metal.

9. In a laser apparatus as claimed in claim 8, wherein said given material member is configured to serve as said anode.

10. In a laser apparatus as claimed in claim 1, wherein said given material member is configured as a rod which is heated by said electron beam to produce vapor in which laser action occurs.

11. In a laser apparatus as claimed in claim 1, wherein said anode is located at one side of the direction along which said electron beam travels during operation.

12. In a laser apparatus as claimed in claim 1, wherein said anode is positioned behind said surface of said cathode in which said bore is located, and said given material member is disposed on the other side of said surface of said cathode.

13. In a laser apparatus as claimed in claim 12, wherein said anode is configured to substantially enclose said cathode.

14. In a laser apparatus as claimed in claim 13, wherein surfaces of said cathode are substantially bare of dielectric material.

15. In a laser apparatus as claimed in claim 13, wherein said anode and said cathode are cylindrical in shape.

16. In a laser apparatus as claimed in claim 15, wherein said given material member is configured so as to be disposed coaxially about the longitudinal axis of said cylindrical cathode.

17. In a laser apparatus as claimed in claim 1, and further comprising a plurality of cathodes.

18. In a laser apparatus as claimed in claim 17, wherein one of said cathodes is configured so as to surround another one of said cathodes.

19. In a laser apparatus as claimed in claim 18, wherein said one of said cathodes configured so as to surround another one of said cathodes is maintained at a lower potential during operation than said another one of said cathodes.

20. In a laser apparatus as claimed in claim 18, wherein a bore in said one of said cathodes is aligned with a bore in said another one of said cathodes.

21. In a laser apparatus as claimed in claim 18, wherein said one and said another one of said cathode members are cylindrical in shape and coaxially disposed relative to each other.

22. In a laser apparatus as claimed in claim 21, wherein said anode is coaxially surrounded by said cathode.

23. In a laser apparatus as claimed in claim 22, wherein said given material member is configured to serve as said anode.

* * * * *